(No Model.)

G. R. SCATES.
FRUIT DRIER.

No. 309,256. Patented Dec. 16, 1884.

WITNESSES
F. L. Ouraud
J. R. Littell

INVENTOR
G. R. Scates
by
H. A. Snow & Co.
Attorneys

UNITED STATES PATENT OFFICE.

GEORGE RANDOLPH SCATES, OF KNOXVILLE, TENNESSEE, ASSIGNOR OF ONE-HALF TO WILLIAM B. MELVIN, OF SAME PLACE.

FRUIT-DRIER.

SPECIFICATION forming part of Letters Patent No. 309,256, dated December 16, 1884.

Application filed May 26, 1883. Renewed June 2, 1884. (No model.)

*To all whom it may concern:*

Be it known that I, GEORGE R. SCATES, a citizen of the United States, residing at Knoxville, in the county of Knox and State of Tennessee, have invented a new and useful Fruit-Drier, of which the following is a specification, reference being had to the accompanying drawings.

This invention relates to fruit driers or evaporators of that class which effect their purpose by means of steam; and its object is to provide a device possessing superior advantages in point of simplicity, inexpensiveness, durability, and general efficiency.

Figure 1:
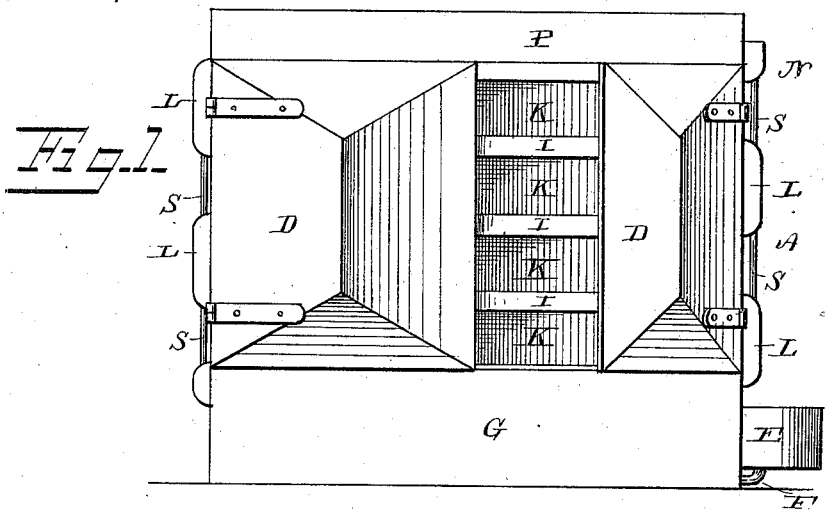
Figure 2:
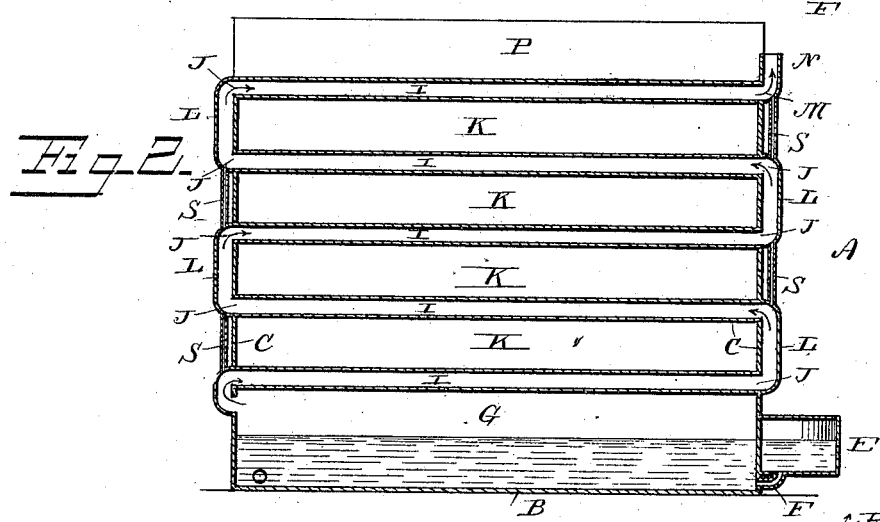
Figures 3, 4:
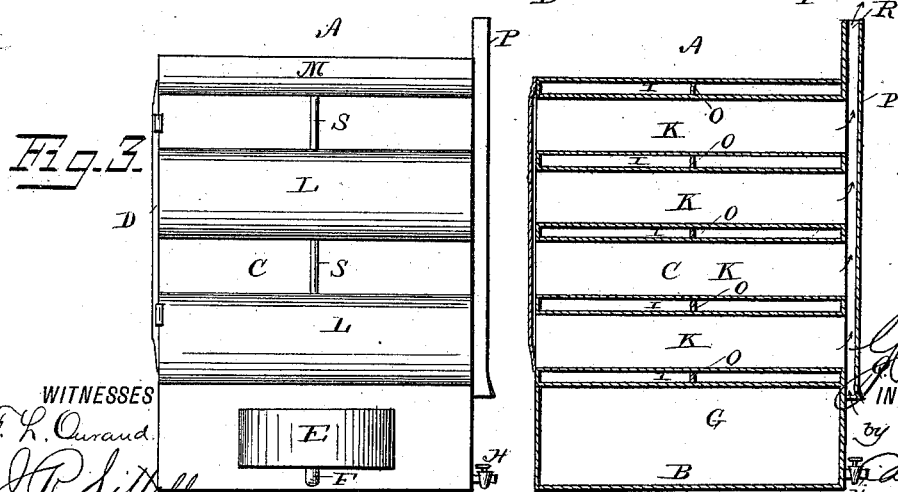

In the drawings, Figure 1 is a side view of my improved evaporator. Fig. 2 is a vertical longitudinal sectional view. Fig. 3 is an end view. Fig. 4 is a vertical transverse sectional view.

Referring to the drawings, A designates the body of my improved evaporator, which is preferably rectangular in form, and comprises a bottom, B, sides C C, and the front doors, D D, as shown.

At the bottom of the body A is provided a tank or water-receptacle, E, secured on the outside of the said body or casing, and having a connecting-pipe, F, leading from its bottom into the casing A. Through this receptacle E the lower portion of the casing, which forms a boiler-chamber, G, is filled, and the water will of course be on a level inside this boiler-chamber the same as its level in the outside receptacle. By keeping the latter filled all danger of an explosion is averted. The boiler-chamber G is provided with a waste-discharge pipe or cock, H.

I designates a series of evaporating-pans, which are of tubular construction, and extend entirely across the casing A, and open at the ends thereof, as shown at J. These tubular pans are arranged one above the other, and thus separate the casing into a number of evaporating-compartments, K, so that the heat from the steam-pans I will radiate from the said tubular pans into both the compartment above and below. The open ends J of these steam-pans are connected by transverse steam boxes or chests, L, and the steam has thus a continuous uninterrupted passage from the boiler into the first steam-box L, thence through the lowermost pan I into the next steam box or chest, and so on until it escapes at the end M of the top pan I, a check-valve, N, being arranged at this latter opening. The connecting steam-chests L are arranged at alternate ends of the casing A, whereby the steam has to pass back and forth from one end of the casing to the other, to better utilize its heat; and the pans I are preferably provided with central longitudinal partitions, O, to strengthen them and obviate sagging. This improved evaporator is to be placed on a stove or used in connection with a furnace, as desired, and the screens or pans containing the fruit are to be placed on the pans I and in the chambers K.

At the rear side of the casing A is provided a longitudinally-disposed vertical flue, P, at the bottom of which cold air enters through a longitudinal slit or opening, Q, while the evaporated or heated air is discharged at the top slit or opening, R, as shown by the arrow.

The operation and advantages of my invention are obvious. It is very simple and efficient, as a very high temperature is continually retained throughout the casing. Sections can be added to the casing when desired.

The steam boxes or chests L are preferably connected by vertically-disposed pipes S, which enable the condensed steam to flow easily and directly back to the boiler.

I claim as my invention—

1. The combination of the casing, the water tank or receptacle arranged on the outside of the casing, near its bottom, and having a connecting-pipe leading into the latter, so that the level of the water in the boiler will be the same as the level in the outside tank, the series of tubular evaporating-pans through which the steam from the boiler passes, and the flue at the side of the casing, having a bottom opening for the admission of cold air, and a top slit or opening for the exhaust of the evaporated air, as set forth.

2. The combination of the casing having the steam-boiler chamber at its bottom, the feeding-tank arranged on the outside of the casing and connected with the boiler-chamber, the tubular evaporating-pans extending the width and length of the casing and forming partitions by which the latter is divided into a vertical series of evaporating-compartments, the steam chests or boxes connecting the ends of these evaporating-pans and arranged at alternate ends of the casing, and the flue at one side of the casing, arranged vertically and having the top and bottom openings, as and for the purpose set forth.

In testimony that I claim the foregoing as my own I have hereto affixed my signature in presence of two witnesses.

GEORGE RANDOLPH SCATES.

Witnesses:
WAT. M. COCKE,
W. K. MITCHELL.